United States Patent
Allan (10) Patent No.: US 8,879,385 B2
(45) Date of Patent: Nov. 4, 2014

(54) USE OF SUB PATH MAINTENANCE ELEMENTS (SPMES) FOR MULTIPROTOCOL LABEL SWITCHING (MPLS) SHARED MESH PROTECTION

(75) Inventor: David Ian Allan, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 536 days.

(21) Appl. No.: 13/170,113

(22) Filed: Jun. 27, 2011

(65) Prior Publication Data

US 2012/0243406 A1 Sep. 27, 2012

Related U.S. Application Data

(60) Provisional application No. 61/466,861, filed on Mar. 23, 2011.

(51) Int. Cl.
- *H04L 12/26* (2006.01)
- *H04L 12/723* (2013.01)
- *H04L 12/707* (2013.01)
- *H04L 12/703* (2013.01)

(52) U.S. Cl.
CPC ............... *H04L 45/50* (2013.01); *H04L 45/22* (2013.01); *H04L 45/28* (2013.01)
USPC ............ 370/228; 370/225; 370/242; 709/223

(58) Field of Classification Search
None
See application file for complete search history.

(56) References Cited

U.S. PATENT DOCUMENTS

| | | | |
|---|---|---|---|
| 2006/0203720 A1 | 9/2006 | Kano | |
| 2007/0036073 A1 | 2/2007 | Yamada et al. | |
| 2009/0147674 A1* | 6/2009 | Scudder et al. | 370/225 |
| 2010/0271955 A1* | 10/2010 | Atsumi | 370/241 |

OTHER PUBLICATIONS

N. Sprecher et al., "Multiprotocol Label Switching Transport Profile Survivability Framework", Dec. 20, 2010 draft-ietf-mpls-tp-survive-fwk-06.txt.*
Dave Allan et al., "A framework for the use of SPMEs for shared mesh protection draft-allan-spme-smp-fmwk-00," Nov. 2011, 6 pages, MPLS Working Group, Internet Draft, IETF Trust.
Jiang Zhang et al., "Two Novel Tunnel-based Ring Protection Switching for MPLS-TP Multicast Services," 2011, 5 pages, 18th International Conference on Telecommunications, IEEE.
Tae-Sik Cheung et al., "MPLS-TP Shared Mesh Protection, draft-cheung-mpls-tp-mesh-protection-02.txt," Oct. 25, 2010, 18 pages, MPLS Working Group, Internet Draft, IETF Trust and the persons identified as the document authors.
Ping Pan et al., "Supporting Shared Mesh Protection in MPLS-TP Networks, draft-pan-shared-mesh-protection-01.txt," Mar. 14, 2011, 16 pages, IETF, Internet Draft, IETF Trust and the persons identified as the document authors.

* cited by examiner

*Primary Examiner* — Jackie Zuniga Abad
(74) *Attorney, Agent, or Firm* — Blakely Sokoloff Taylor & Zafman LLP (57) ABSTRACT

Embodiments of the invention include a computer-implemented method of shared backup path computation in an multiprotocol label switching (MPLS) network, the shared backup path to be used upon a failure of at least one working path of the MPLS network.

11 Claims, 5 Drawing Sheets

USE OF SUB PATH MAINTENANCE ELEMENTS (SPMES) FOR MULTIPROTOCOL LABEL SWITCHING (MPLS) SHARED MESH PROTECTION

CROSS-REFERENCE TO RELATED APPLICATIONS

This application claims the benefit of U.S. Provisional Application No. 61/466,861, filed Mar. 23, 2011, which is hereby incorporated by reference.

TECHNICAL FIELD

Embodiments of the invention relate to shared mesh protection in Multiprotocol Label Switching (MPLS) networking.

BACKGROUND

Shared mesh protection (SMP) is a common protection and recovery mechanism in transport networks, where multiple paths can share the same set of network resources for protection purposes. Shared mesh protection allows paths that do not share common points of failure to share protection resources. This is based on the assumption that the likelihood of simultaneous multiple failures or failures within the repair window is low.

When considering control plane based recovery mechanisms it is possible to provide the necessary communication and coordination between nodes to enact pre-emption in shared mesh networks. However this is a time consuming process and will not produce the sort of recovery times expected of a transport network. Hence a solution is desired that works when executive action has been delegated to the data plane that will operate at protection switching speeds, in the order of milliseconds.

The operation of shared mesh protection has extra caveats of preemption and over-subscription. Handling these issues may be an undesirable message and database intensive issue that the nodes of the network will have to handle. Existing solutions attempt to coordinate path preemption by explicit coordination protocols and in some cases knowledge of the business priority of the set of paths in the shared resource. This has a number of issues:
1) Coordination of many path protection/preemption selectors will slow down the protection switching time for the network.
2) Pre-emption means ALL of a preempted customers traffic is discarded, even if the bandwidth available is not fully consumed by the preferred service.
3) Packet pipes are infinitely elastic and therefore the issue of what paths to preempt in order to support a preferred path becomes a much more complex problem and one that has to be coordinated at all preemption points such that all selectors match up and this imposes constraints on how shared protection domains can be set up. Any attempt to impose a distributed algorithm to allow uncoordinated yet a common decision process requires that the ingress and egress selectors need a common view of the path set in order to independently agree on what to preempt.

SUMMARY

Embodiments of the invention include a computer-implemented method of shared backup path computation in an multiprotocol label switching (MPLS) network, the shared backup path to be used upon a failure of at least one working path of the MPLS network. The method includes determining if a link from a first node of a path list in a MPLS network topology to a second node in the MPLS network topology is link shared as a backup link between the first node and a third node in the MPLS network topology. A cross-connecting label associated with the egress link if the egress link is a shared backup link is created. The method also includes creating a sub-path maintenance element (SPME) label to be pushed onto a packet to be sent from the first node to the second node of the MPLS network to create a shared backup path, wherein the SPME label includes a business priority indication if the egress link is a shared backup link and indicates a path over the shared backup link. The shared shared backup path is stored in a database of a router in the MPLS network.

Embodiments of the invention include a computer-implemented method of processing a packet in multiprotocol label switching (MPLS) network utilizing sub-path maintenance element (SPME) shared mesh protection. The method includes receiving a packet in the MPLS network at a network element, the packet to be forwarded along a label switched path (LSP) in the MPLS network and including a label. A determination of if there is a failure between the receiving network element and the end of the LSP is made. And, a SPME label is pushed onto the received packet if there is a failure, the SPME label including a business priority indication of the packet and indicating that the LSP should use a shared backup link and the packet forwarded.

Embodiments of the invention include an network element in a multiprotocol label switching (MPLS) network utilizing sub-path maintenance element (SPME) shared mesh protection. The network element includes logic to determine if a link from a first node of a path list in a MPLS network topology to a second node in the MPLS network topology is link shared as a backup link between the first node and a third node in the MPLS network topology. There is also logic to create a cross-connecting label associated with the egress link if the egress link is a shared backup link and create a sub-path maintenance element (SPME) label to be pushed onto a packet to be sent from the first node to the second node of the MPLS network to create a shared backup path, wherein the SPME label includes a business priority indication if the egress link is a shared backup link. Additionally, there is logic to store the shared backup path in a database of a router in the MPLS network.

BRIEF DESCRIPTION OF DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Embodiments discussed herein attempt to avoid the issues detailed above. It does not involve complex coordination of selectors, it works with largely existing mechanisms, and it only degrades preempted traffic instead of completely displacing it.

Embodiments of the basic concept described below to use packet scheduling priority indicators on selected links to indicate business priority instead of application priority.

When a backup path is routed to the ingress of a shared segment, the label of arrival is associated with a sub path maintenance entity (SPME) with the appropriate markings that transits the desired ingress to egress of the shared domain. A SPME is a LSP instantiated for monitoring, protecting, and managing label switch paths (LSPs) in a MPLS network domain. In the MPLS-TP context an SPME spans some portion of an LSP or set of LSPs considered to require a common Operations, Administration, and Maintenance (OAM) treatment separate from that of the end-to-end path (s).

Hence if the backup path is actually used, the packets cross the shared domain with packet precedence based on business priority encoded in the associated SPME traffic control (TC) bits, lower priority traffic getting lower precedence and therefore a higher probably of discard if resources are contended. In some embodiments, there are three TC bits allowing for a business priority granularity of up to 8 classes.

This requires no dynamic coordination whatsoever, and simply works using existing mechanisms. It becomes a network planning and configuration issue.

A common interpretation of the behavior of shared mesh protection emerges from the circuit switched world whereby subtending path selectors and selector coordination support path preemption functionality to ensure that the highest priority path needing the protection resources is granted exclusive ownership of the shared segment, all others being preempted. It also assumes that all paths sharing the protection resources conveniently all need exactly the same size pipe.

In packet transport networks there will frequently not be a convenient 1:1 equivalence of the bandwidth requirements of the set of transport paths sharing protection resources such that a simple pre-emption decision can be made. For example 3 paths: A, B, and C sized "n", "n/2" and "n/2" respectively could have a shared segment size "n" such that simultaneous failures necessitating the activation of B and C could be accommodated without path preemption.

Nor in a packet environment is there the need to completely preempt all the traffic in a lower priority path simply because a higher priority path lays claim to the resources.

If one pursues this line of thinking to its logical conclusion, and envisions a significant set of paths of diverse sizes and diverse priorities, the policy associated with successful path prioritization and preemption becomes quite complex, and ensuring multiple selectors make timely and of necessity common preemption decisions starts to impose network design constraints that severely impact the utility of SMP.

Further in a packet network there can be a difference in the bandwidth reserved and the bandwidth actually used at any given instant in time. One consequence is that there is no need to completely preempt all the traffic in a lower priority path simply because a higher priority path lays a preferential claim to the bandwidth.

The arrangement of the shared protection links can be arbitrary such that contiguous domains can be constructed with an arbitrary number of ingress and egress points. A set of contiguous protection links is known as a protection domain.

Figure 2:
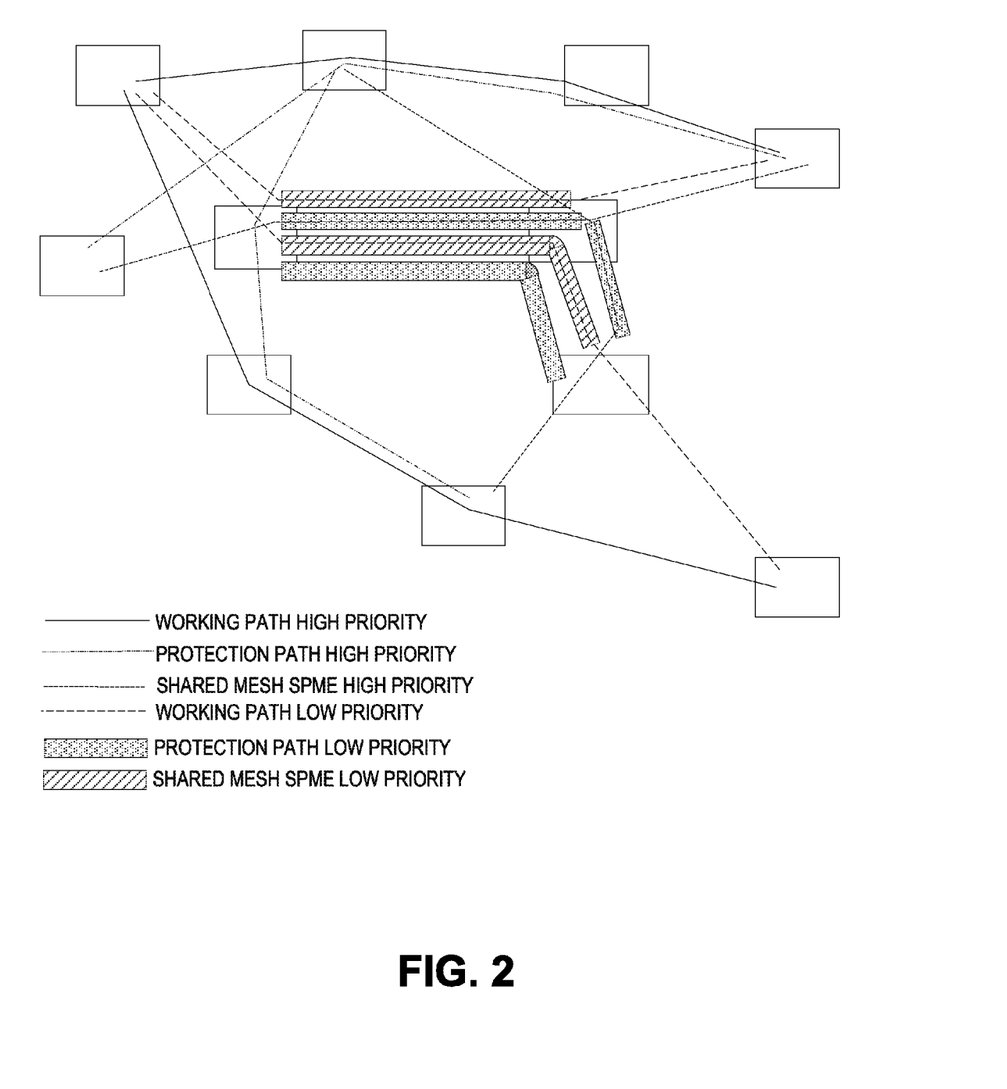
FIG. 2 illustrates an example of protection paths using business priority.

FIG. 2 illustrates an example of protection paths using business priority. Working paths traverse links that can carry the sum of all traffic. Protection paths are only uncontended at a given business priority. The sum of all traffic for all business priorities can oversubscribe link.

Figure 1:
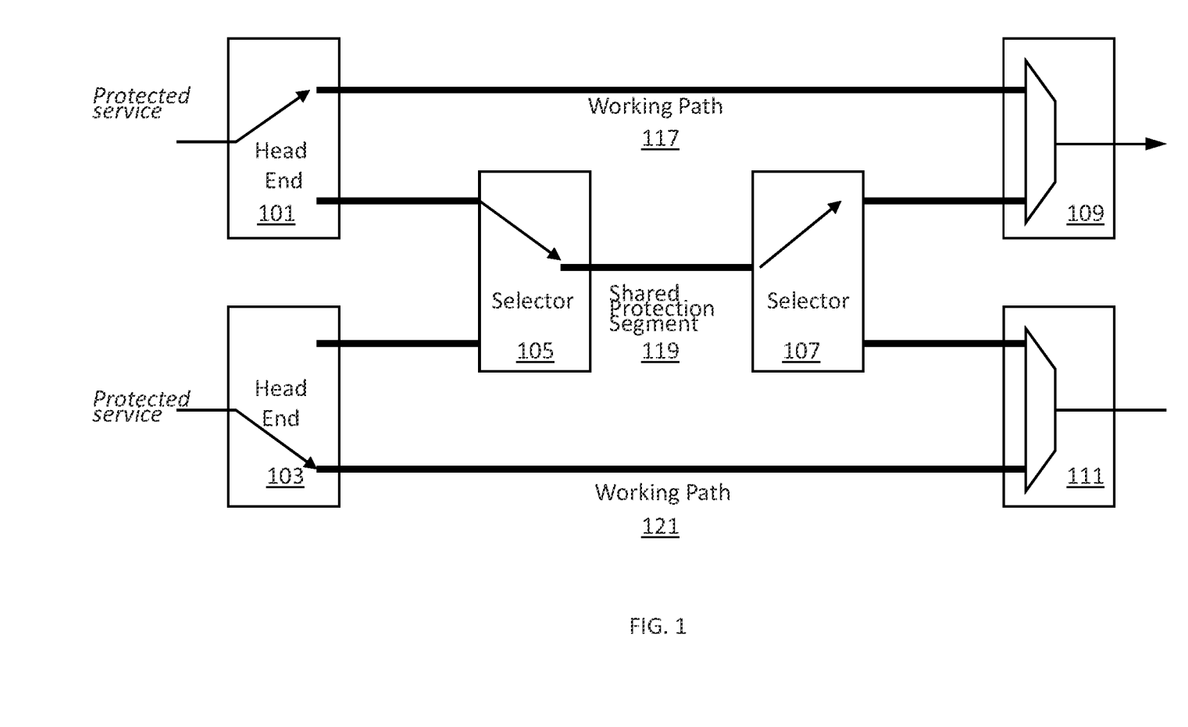
FIG. 1 illustrates an example of simple shared mesh protection.

FIG. 1 illustrates an example of simple shared mesh protection. In this example there are two head ends 101, 103 each of which has a protected service that it communicates with another end of 109, 111. In some embodiments, these ends 101, 103, 109, and 111 are label edge routers (LERs) that exist at the endpoint of an LSP and pushes and pops LSP labels. In other embodiments, the ends are label switching routers (LSRs). Typically, LSRs are either provider edge (PE) or provider (P) routers for a given LSP.

An SPME is defined between the edges of the portion of the LSP that needs to be monitored, protected or managed. In this example, the SPME may either be from endpoint to endpoint, or any combination in between. The SPME forms an MPLS-TP section that carries the original LSP over this portion of the network as a client. OAM messages can be initiated at the edge of the SPME and sent to the peer edge of the SPME or to a MIP along the SPME by setting the TTL value of the LSE at the corresponding hierarchical LSP level. A P router only pushes or pops a label if it is at the end of a SPME. In this mode, it is an LER for the SPME.

The end-to-end traffic of the LSP, including data traffic and control traffic (OAM, Protection Switching Control, management and signaling messages) is tunneled within the hierarchical LSP by means of label stacking.

SPMEs can be provisioned either statically or using control-plane signaling procedures. The make-before-break procedures which are supported by MPLS allow the creation of a SPME on existing LSPs in-service without traffic disruption. A SPME can be defined corresponding to one or more end-to-end LSPs. New end-to-end LSPs that are tunneled within the SPME can be set up, which may require coordination across administrative boundaries.

Traffic of the existing LSPs is switched over to the new end-to-end tunneled LSPs. The old end-to-end LSPs can then be torn down. Hierarchical label stacking, in a similar manner to that described above, can be used to implement Sub-Path Maintenance Elements on pseudowires.

Under "normal" operation, these protected services are transmitted from the head end 101, 103 to the other end 109, 111 respectively through working paths 117, 121. These paths do not share endpoints.

These two protected paths share a backup segment 119 that may be used to transmit the protected service if one or both of the working paths 117, 121 experience a failure. If there is a failure in only one working path (e.g., from head end 101 to end 109), then the shared protection segment 119 carries traffic from only working path (e.g., working path 117). However, if there are failures in both working paths 117, 121, a selection between the two protected services will be made. Two shared selectors 105, 107 are utilized to make this selection. However, to make this selection in a conventional system, the head ends 101, 103 and shared selectors 105, 107 all need reliable coordination to successfully protection switch. Both shared selectors 105, 107 need to have identical information on preemption for the protected services (i.e., which protected service gets priority). These shared selectors 105, 107 need to make identical decisions on what protected service should be selected. The selectors 105, 107 should work in such a way that if both working paths fail, the service with the higher business priority gets use of the bandwidth in the shared protection segment In some embodiments, the selection is simplified by encoding business priority on a packet-by-packet basis across the shared segment 119. In at least some of these embodiments, packets with the highest business priority always get through on the shared protection path and packets with lower priority will use unused bandwidth on that path.

Using a business priority approach allows for no required selector coordination, no additional required protocol elements, and no artificial constraints on the locations of ingress to and egress from shared segments.

In this approach, links are uniquely set aside as shared segment links. In some embodiments this could be virtual links in the form of L-LSPs that traffic is policed/shaped into. An L-LSP is a label switched path (LSP) on which nodes infer the quality of service (QoS) treatment for MPLS packets from the packet label and the EXP bits (or the CLP bit for cell-mode MPLS) of the packet. In particular, the label is used to encode the class a packet belongs to and the EXP (experimental) field (or the CLP bit for cell-mode MPLS) is used to encode the drop precedence of the packet. A separate LSP can be established for each combination of forward equivalence class (FEC) and class.

SPMEs at the ingress to a shared segment link use the pipe model of DiffServ Code Point (DSCP) handling to impose encoding of business priority in the traffic class (TC) or EXP field of the SPME label. Actual application encodings are simply tunneled. In other words, when a shared link is reached, a new label (pre-configured to be inferred by the label of arrival) is pushed with business priority encoded in the EXP/TC QoS bits. In some embodiments, there are at least two business priorities. The pipe model of TC copying is used such that the SPME gets the TC marking associated with the business priority for the path associated with the incoming label value. As the SPME only transits resources where the TC marking has been overloaded in this fashion business priority does not conflict with application requirements.

The business priority for a particular packet may be determined in several different ways. In some embodiments, a database or table is stored in one or more network elements of the MPLS network that stores a mapping of a business priority level to an application, user, etc.

In some embodiments of the business priority approach, there cannot be a label to TC mapping at the ingress of an SPME such that the business priority associated with/inferred by the label could map to a single SPME E-LSP that encoded all business priorities in the TC bits. An E-LSP is an LSP on which nodes infer the QoS treatment for MPLS packet exclusively from the EXP bits in the MPLS header. Therefore multiple SPMEs may need to be instantiated between any two points of the shared protection path.

In some embodiments, there are operational refinements that may be made.

Because SPMEs can aggregate traffic, in some implementations only one is required to handle all traffic of a given business priority between each ingress/egress pair of a set of contiguous links delegated to shared segment operation.

Call Admission Control (CAC) between any ingress/egress pair during backup path planning can allow bandwidth from an arbitrary set of end points to sum to 100% of what is available for a given business priority such that under multiple failure scenarios a given business priority is never contended. In this refinement, high priority can be full but lower priority slots available for paths with lower priority and no common points of failure with the higher priority paths. Admission control for the protection paths transiting the protection domain is performed such that the sum of the bandwidth for a given business priority does not oversubscribe any links in the protected domain, but the sum of the bandwidth for all business priorities can. In this way no traffic of the highest business priority using the shared mesh pool will be contended.

If signaling carried an indication of business priority, at the ingress to a shared protection domain, the SPME could be inferred from the combination of priority and the explicit route object (ERO) that defined hops of the path being set up permitting the SPME with the correct priority and domain egress is selected FIGS. 3 and 4 below describe embodiments of methods for calculating working paths and shared backup paths. These paths are stored in a database available to, or a part of, at least a LSR of a SPME.

Figure 3:
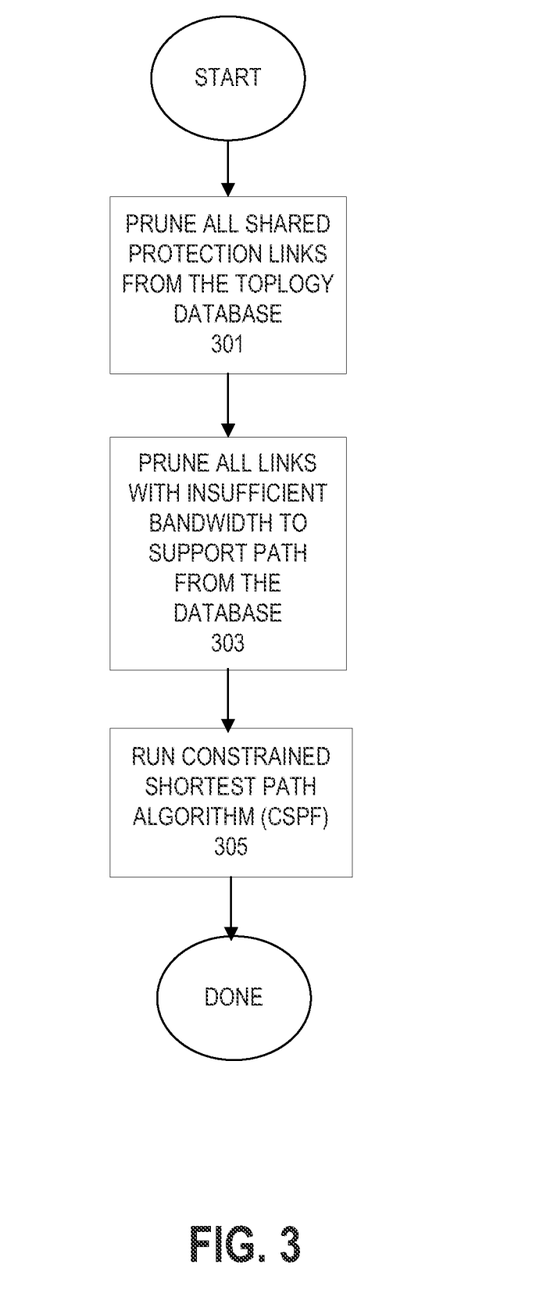
FIG. 3 illustrates an embodiment of working path computation.

FIG. 3 illustrates an embodiment of working path computation. As noted above, a working path is a path used during "normal" operation (the shared protection segment is not used). At 301, all shared protection links from the topology database of the network are pruned. Pruning in this instance does not mean that the links are removed from the database, but that they are removed from consideration in the computation.

At 303, all links with insufficient bandwidth to support a path are pruned from the database. At 305, a constrained shortest path (CSPF) algorithm is run to calculate the working path. In some embodiments, calculated working paths are stored in a Management Information Base (MIB) of an LSR.

Figure 4:
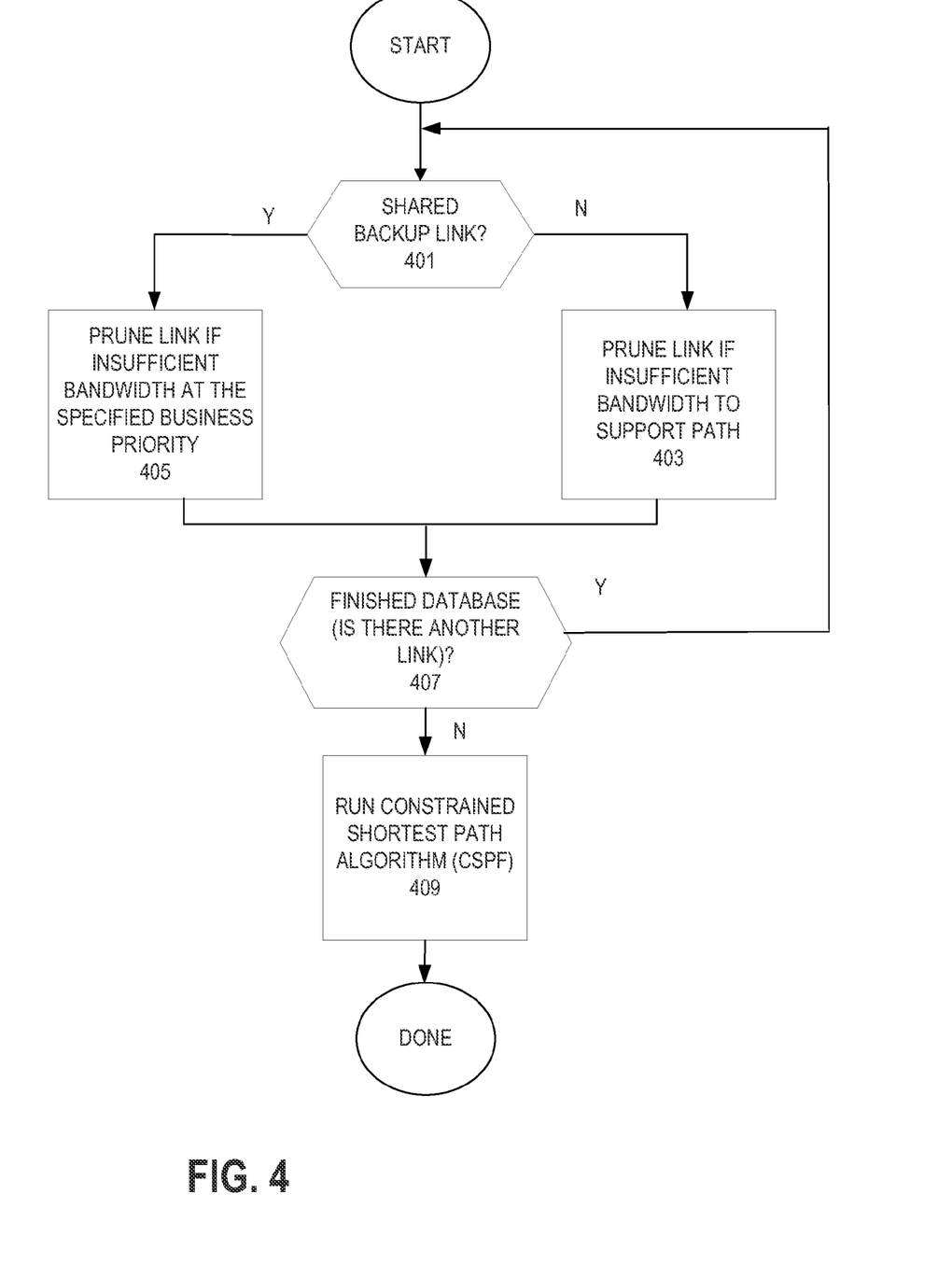
FIG. 4 illustrates an embodiment of shared backup path computation.

FIG. 4 illustrates an embodiment of shared backup path computation. At 401, a determination is made of if the link is a shared back up link. For example, is the link a working path like 117 or a shared protection segment like 119?

If the link is not a shared backup link, it will be pruned from the computation if insufficient bandwidth is available in the link to support a path at 403. For example, the path has too much traffic or is not wide enough to handle the required amount of traffic. If there is sufficient bandwidth available, the link will not be pruned. If the link is a backup link, it will be pruned from the computation if there is insufficient bandwidth at the specified business priority at 405. If there is sufficient bandwidth at the specified business priority available, the link will not be pruned. In some embodiments, calculated working paths are stored in a Management Information Base (MIB) of an LSR.

A determination of if this is the last link in the topology database is made at 407. If it is not the last link, then the next link is evaluated at 401. If it is the last link, then a CSPF algorithm is run to determine a shared backup path.

Figure 5:
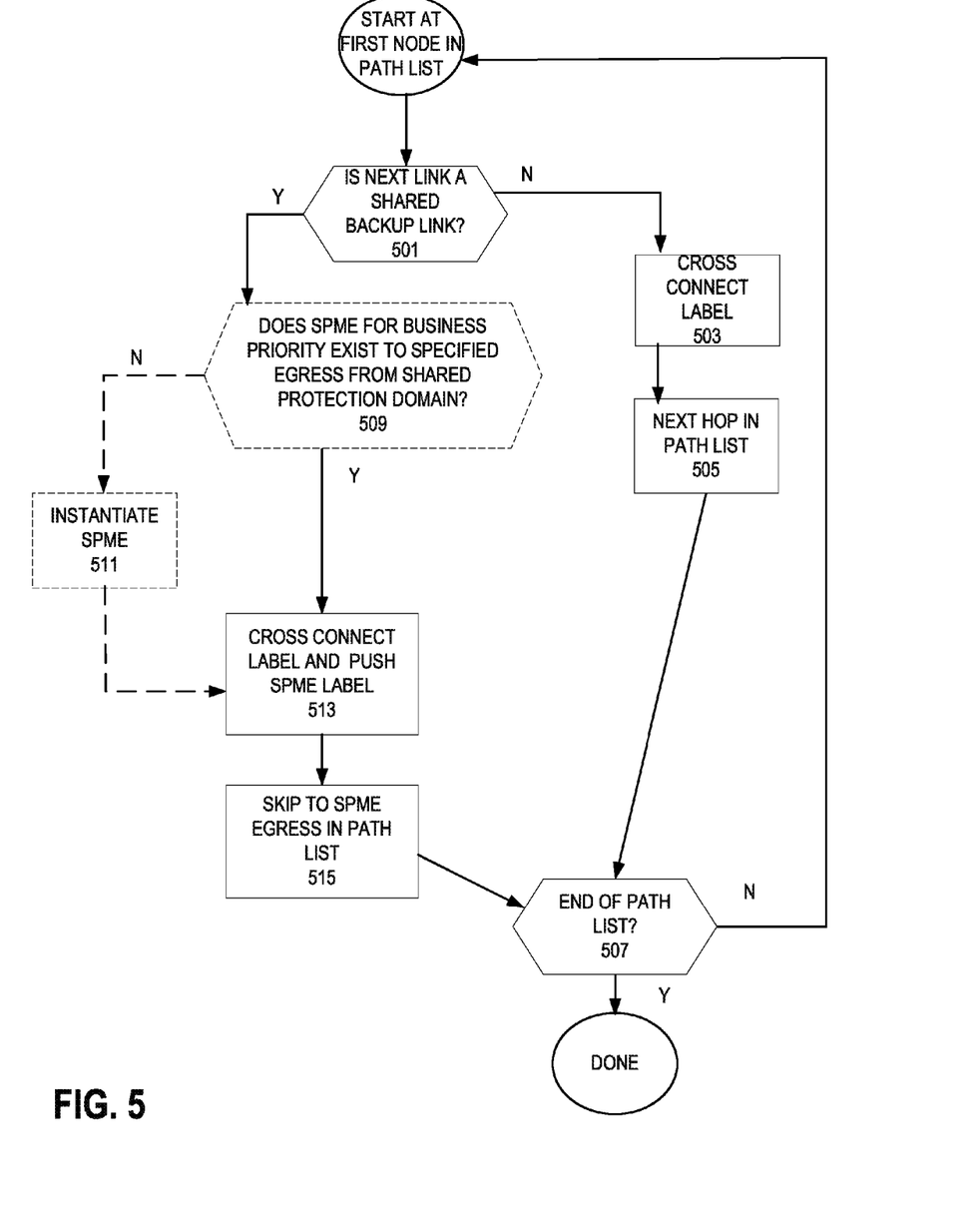
FIG. 5 illustrates an exemplary method of backup path setup.

FIG. 5 illustrates an exemplary method of backup path setup. Starting with the first node in a path list, a determination is made of if the next link a shared backup link at 501. If not, then a label is cross connected at 503. A LSP is modeled as a connection consisting of one or more incoming segments (in-segments such as an MPLS label) and/or one or more outgoing segments (out-segments such as an MPLS label) at a LSR. The association or interconnection of the in-segments and out-segments is accomplished by using a cross-connect.

The next hop in the path list is selected at 505 if possible. If this is not the end of the path list 507, then another determination of if the next link is a shared backup link is made at 501.

If the next link is a shared backup link, then the label will be is cross connected and an SPME label should be pushed onto the packet that is to be sent using the link. In some embodiments, this SPME label includes business priority in the EXP/TC bits. At 515, then a skip is made to the SPME egress in the path list at 515. Again, a determination of if this is the end of the path list is made at 507. If this is the end of the path list, in some embodiments the computation is stored in one or more of the routers' databases.

There are optional optimizations that may be utilized as illustrated. In 509, a determination may be made of if the SPME for a business priority exists to a specified egress from a shared protection domain. If not, then an SPME may be instantiated at 511 using a well understood subset of the procedures in FIG. 5: which is given a path list for the SPME, cross connect labels at each transit node in the path list similar to a loop encompassing steps 503, 505, and 507. The instantiation of protection paths maps the incoming path at an ingress node for the protection domain to an SPME that connects the ingress to the required egress node from the domain.

In some embodiments, one or more of the computations of FIGS. 3-5 are performed during the configuration of the MPLS network. The paths that are calculated may be stored in the endpoints and/or selectors such as in a MIB.

The routers described above may be referred as network elements. A network element (e.g., a router, switch, bridge) is a piece of networking equipment, including hardware and software, that communicatively interconnects other equipment on the network (e.g., other network elements, end stations). Embodiments of these network elements include logic adapted to perform one or more of the methods detailed above. Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures such as a MIB) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

For layer 2 forwarding, the network element can store one or more bridging tables that are used to forward data based on the layer 2 information in this data.

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms.

What is claimed is:

1. A computer-implemented method of a shared backup path computation in a multiprotocol label switching (MPLS) network, the shared backup path to be used upon a failure of at least one working path of the MPLS network, the method comprising the steps of:
   determining if a link from a first node of a path list in a MPLS network topology to a second node in the MPLS network topology is link shared as a backup link between the first node and a third node in the MPLS network topology;
   creating a cross-connecting label associated with an egress link if the egress link is a shared backup link;
   creating a sub-path maintenance element (SPME) label to be pushed onto a packet to be sent from the first node to the second node of the MPLS network to create the shared backup path, wherein the SPME label includes a business priority indication if the egress link is a shared backup link and indicates a path over the shared backup link, wherein the business priority indication is to be encoded in a traffic class (TC) field of the SPME label; and
   storing the shared backup path in a database of a router in the MPLS network.

2. The method of claim 1, further comprising the step of:
   determining that a SPME for the business priority exists for the specified egress link prior to the cross-connecting.

3. The method of claim 1, further comprising the steps of:
   determining that a SPME for the business priority does not exist for the specified egress link prior to the cross-connecting; and
   instantiating the SPME for the business priority.

4. The method of claim 1, wherein the TC field of the SPME label is three bits.

5. The method of claim 1, further comprising:
   creating a second cross-connecting label associated with the egress link if the egress link is not a shared backup link;
   storing the path in the database of the router in the MPLS network.

6. A computer-implemented method of processing a packet in a multiprotocol label switching (MPLS) network utilizing sub-path maintenance element (SPME) shared mesh protection, the method comprising the steps of:
   receiving the packet in the MPLS network at a network element, the packet to be forwarded along a label switched path (LSP) in the MPLS network and including a label;
   determining if there is a failure between the receiving network element and the end of the LSP;
   pushing a SPME label onto the received packet if there is a failure, the SPME label including a business priority indication of the packet and indicating that the LSP should use a shared backup link, wherein the business priority indication is to be encoded in a traffic class (TC) field of the SPME label; and
   forwarding the packet including SPME label to a second network element using the shared backup link.

7. The method of claim 6, further comprising the steps of:
   forwarding the packet to a network element along the LSP if there is a not a failure.

8. The method of claim 6, further comprising the steps of:
   determining if there is another packet with a higher business priority attempting to use the shared backup link and forwarding the packet with the highest priority.

9. The method of claim 8, further comprising the steps of:
   dropping the packet with a lower business priority.

10. The method of claim 8, further comprising the steps of:
    storing the packet with a lower business priority until adequate resources are available on the shared backup link.

11. A network element in a multiprotocol label switching (MPLS) network utilizing sub-path maintenance element (SPME) shared mesh protection, the network element configured to:
    determine if a link from a first node of a path list in a MPLS network topology to a second node in the MPLS network topology is link shared as a backup link between the first node and a third node in the MPLS network topology;
    create a cross-connecting label associated with an egress link if the egress link is a shared backup link;
    create a sub-path maintenance element (SPME) label to be pushed onto a packet to be sent from the first node to the second node of the MPLS network to create a shared backup path, wherein the SPME label includes a business priority indication if the egress link is a shared backup link, wherein the business priority indication is to be encoded in a traffic class (TC) field of the SPME label; and
    store the shared backup path in a database of a router in the MPLS network.

* * * * *

UNITED STATES PATENT AND TRADEMARK OFFICE
CERTIFICATE OF CORRECTION

PATENT NO. : 8,879,385 B2  
APPLICATION NO. : 13/170113  
DATED : November 4, 2014  
INVENTOR(S) : Allan Page 1 of 1

It is certified that error appears in the above-identified patent and that said Letters Patent is hereby corrected as shown below:

In the Claims

In Column 10, Line 14, in Claim 7, delete "steps" and insert -- step --, therefor.

In Column 10, Line 17, in Claim 8, delete "steps" and insert -- step --, therefor.

In Column 10, Line 21, in Claim 9, delete "steps" and insert -- step --, therefor.

In Column 10, Line 23, in Claim 10, delete "steps" and insert -- step --, therefor.

Signed and Sealed this  
Thirtieth Day of June, 2015

Michelle K. Lee  
*Director of the United States Patent and Trademark Office*